Nov. 3, 1942.   D. D. ORMSBY   2,300,631
VEHICLE
Filed Feb. 21, 1940   3 Sheets-Sheet 1

INVENTOR.
Donald D. Ormsby.
BY Walter C. Schirmer
ATTORNEY

Nov. 3, 1942.  D. D. ORMSBY  2,300,631
VEHICLE
Filed Feb. 21, 1940  3 Sheets-Sheet 2

INVENTOR.
Donald D. Ormsby.
BY Walter E. Schirmer
ATTORNEY.

Nov. 3, 1942.                D. D. ORMSBY                2,300,631
                               VEHICLE
                         Filed Feb. 21, 1940           3 Sheets-Sheet 3
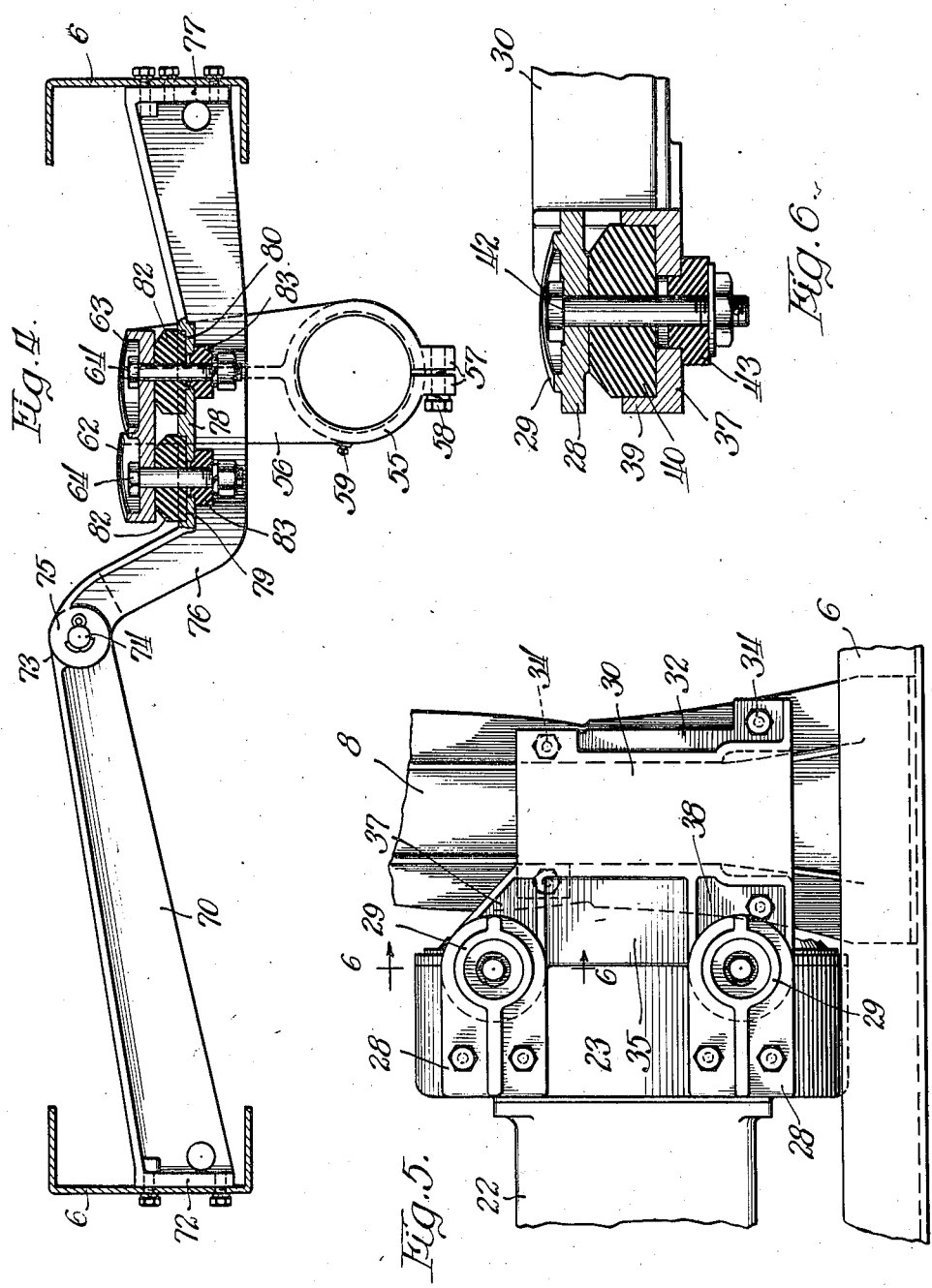
INVENTOR.
Donald D. Ormsby.
BY Walter E. Schirmer
ATTORNEY.

Patented Nov. 3, 1942

2,300,631

UNITED STATES PATENT OFFICE 2,300,631

VEHICLE

Donald D. Ormsby, Buchanan, Mich., assignor to Clark Equipment Company, Buchanan, Mich., a corporation of Michigan Application February 21, 1940, Serial No. 319,996

16 Claims. (Cl. 248—3)

This invention relates to vehicles, and more particularly is directed to a vehicle of the type disclosed in my copending application, Serial No. 256,947, filed February 17, 1939, which is directed to the provision of a truck or tractor provided with a secondary or supplemental power unit automatically controlled in accordance with speed and load conditions to supply additional torque for maintaining desired speeds on grades and the like.

The present invention is directed particularly to the manner in which the secondary or supplemental power unit is supported in operative position in the vehicle chassis.

One of the important objects of the present invention is to provide supporting means for a power unit of this type which is disposed in a laterally offset relation with respect to the center plane through the chassis that will absorb or take the reaction of the torque of this engine, and will also provide for a resilient or floating mounting of the power unit so that vibrations thereof are not transmitted to the vehicle.

Another important object of the present invention is to provide means supporting the power unit on the chassis in such manner that there is no possibility of the power unit fish-tailing relative to the chassis when its torque is applied to the main drive system of the vehicle.

Still another important feature of the present invention is the provision of a toggle connection between the supporting arms of the engine, thereby imparting compression stresses to the arms and insuring transference of the load of the power unit to both side rails of the chassis.

Other objects and advantages of the present invention will appear more fully from the following detailed description which, taken in conjunction with the accompanying drawings, will disclose to those skilled in the art the particular construction and operation of a preferred form of the invention.

In the drawings:

Figure 4 is an end elevational view showing the toggle support for one end of the power unit;

Figure 5 is a plan view of the support for the opposite end of the power unit; and Figure 6 is a sectional view taken substantially on line 6—6 of Figure 5.

Figure 1:
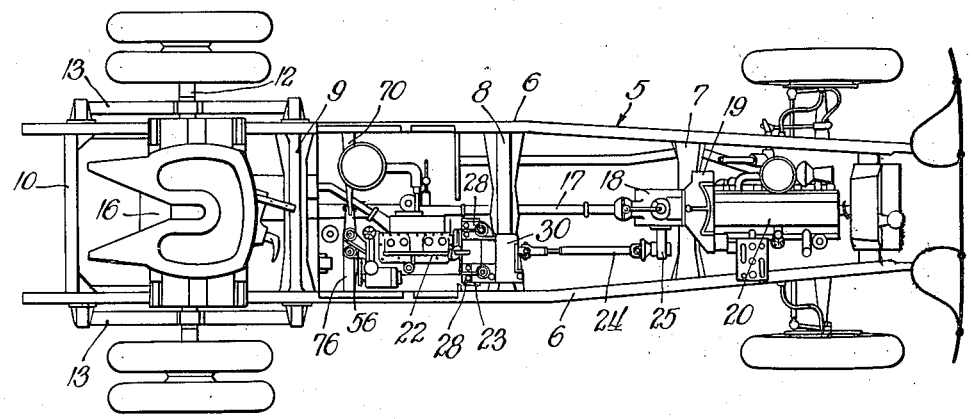
Figure 1 is a plan view showing a tractor chassis incorporating the present invention.

Referring now in detail to the drawings, the chassis indicated generally at 5 in Figure 1 comprises the longitudinally extending side rails 6 spaced apart by means of transverse rigid cross members 7, 8, 9 and 10. The rear axle assembly 12 is supported by means of the springs 13 from the chassis, and disposed above the axle assembly is the fifth wheel member 16 whereby a trailer may be coupled to the tractor. The chassis is provided with the longitudinally extending propeller shaft 17 disposed substantially in the central longitudinal plane of the vehicle and which, at its forward end, is connected to the rear end of a transmission 18 that is coupled through the clutch 19 to the main power unit 20.

Disposed rearwardly of the cross member 8 and at one side of the propeller shaft 17 is the auxiliary power unit 22 which faces in a direction opposite to the power unit 20, that is, with its conventional forward end directed toward the rear of the vehicle. Extending out of the bell housing 23 secured to the rear end of the engine unit 22 is the counter or lay shaft 24 which, through the gearing 25, is connected to the countershaft of the transmission 18, as described in detail in my above-mentioned application.

Suitable controls are provided for starting and stopping the engine 22 under predetermined load and speed conditions but since these form no part of the present invention, no description thereof is believed necessary.

Considering now in detail the manner in which the power plant 22 is supported on the vehicle, the rear end of this power plant or engine has secured thereto the bell housing 23 which is provided with bosses 27 at the upper end thereof on which are secured the bracket members 28 having the forwardly extending portions 29.

Figure 3:
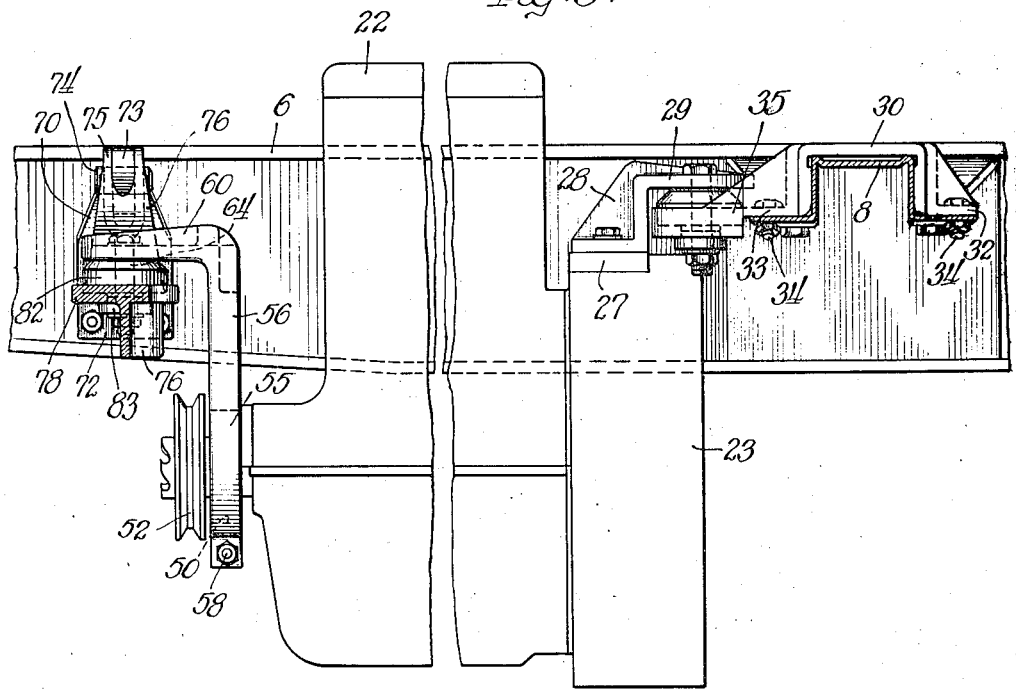
Figure 3 is a side elevational view, partly in section, showing how the power unit is supported at its opposite ends.

The cross member 8, as shown clearly in Figure 3, is of flanged channel-shaped section, and mounted thereover adjacent the side rail 6 is a bracket or support member 30 which embraces the channel portion of the cross member and is rigidly secured thereto by means of the flanged projections 32 and 33 which are bolted to the flanges of the cross member by means of the bolts 34. The bracket 30 is provided with a rearwardly extending portion 35 which, as shown in detail in Figures 5 and 6, is provided with bosses 37 and 38 spaced longitudinally relative to the cross member 8 and disposed in vertical alinement beneath the overhanging portions 29 of the brackets 28. The bosses 37 and 38 are of cup formation having the recessed flanged portions 39 within which are disposed suitable rubber biscuits or cushions 40 interposed between the bosses 37 and 38 and the overlying portions of the brackets 28 so as to resiliently cushion the brackets 28, and consequently provide a cushioned support for the rear end of the power unit 22 upon the cross member 8. The portions 29 of the brackets 28 are suitably apertured to receive the bolts 42 which extend therethrough and through an enlarged opening in the base of the bosses 37 and 38, and are suitably cushioned as by means of the rubber washers 43 to prevent vertical displacement of the bracket supporting assembly while yet maintaining them in cushioned relation. This provides a resilient support, and by reason of the lateral spacing of the brackets 28, prevents or absorbs any cocking stresses produced by the torque in the engine 22.

Figure 2:
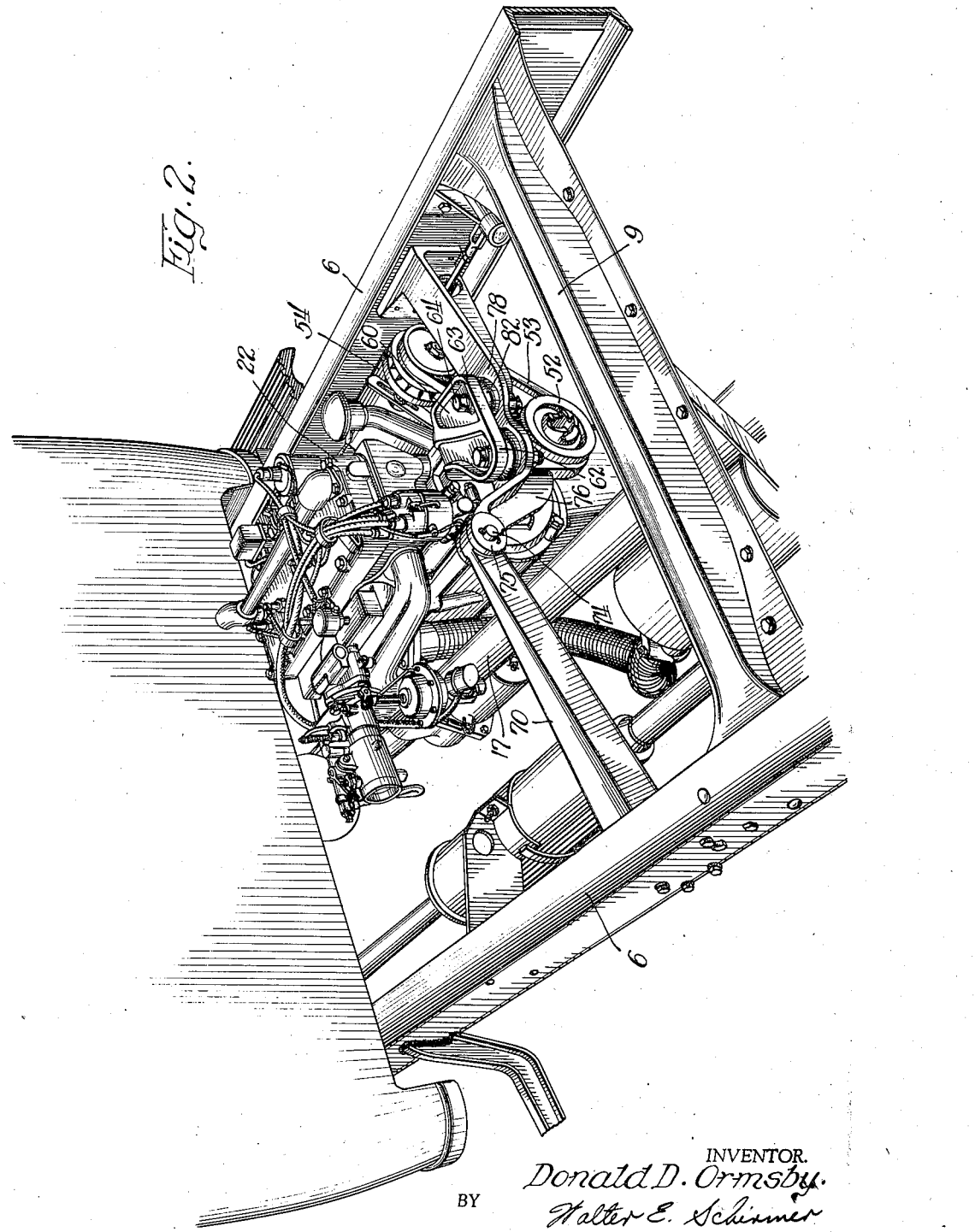
Figure 2 is a perspective view showing the details of the support for one end of the auxiliary power unit.

At the opposite end of the power unit 22 the drive shaft thereof is provided with a trunnion portion 50 over which is disposed the grooved pulley 52 connected by means of the belt 53 to a generator 54 disposed laterally of the engine 22 adjacent the side rail. The trunnion 50 is adapted to be journalled within the collar portion 55 of a bracket member 56, this bracket member being shown in detail in Figures 3 and 4. The bracket portion 55 is of the split clamp type which is provided with the ears 57 through which extends the stud 58 for clamping this journal portion about the trunnion 50. A suitable lubricant nipple 59 is provided for lubricating this journalling arrangement. The bracket 56 at its upper end is provided with the normally turned flange portion 60 which is laterally widened, as shown clearly in Figures 2 and 4, to provide recessed boss portions 62 and 63 which are laterally spaced and are provided with bolts 64 extending therethrough.

Secured to the remote side rail 6 is a rigid angularly extending arm 70 which has the flanged end 72 bolted or otherwise rigidly secured to the web portion of the channel rail 6. At its opposite end the arm 70 is provided with a journalled portion 73 adapted to receive the pin 74 transversely therethrough. This pin is carried in the bifurcated end 75 of a second arm 76 which, at its opposite end, is provided with the flanged portion 77 rigidly secured by means of bolts or rivets to the web of the channel 6 adjacent the power unit. It will be noted from Figures 2 and 4 that the arm 76 extends substantially horizontally from the channel 6 to a point adjacent the pin 74, and is then turned upwardly at a relatively sharp angle so as to provide, in effect, a toggle arm connection which is upwardly arched whereby pressure downwardly on either of the arms results in producing compressive stresses in the arms, tending to press them more firmly against the channel 6. Adjacent its upwardly arched portion the arm 76 is provided with a substantially flat boss 78 provided with cylindrical recesses 79 and 80 adapted to form cups for receiving the rubber biscuits 82 seated therein and forming a resilient cushion between the arm 76 and the bracket 56. The bolts 64 are insulated from the arm by means of rubber washers 83 and function only to prevent vertical displacement between the bracket 56 and the arm 76. The lateral spacing of the biscuits 82 provides for lateral stability, tending to absorb the torque of the power unit 22, while the journalling of the forward end of the engine in the collar 55 prevents any possibility of the engine fish-tailing when its torque is applied to the drive assembly.

This provides therefore in effect, an underslung suspension for the power unit 22 from the cross member 8 and the side rails 6, with the engine being mounted at all points of support upon resilient means such as springs or the rubber biscuits illustrated, thereby insuring no metal to metal contact between the power unit and its supporting means. The lateral spacing of the supporting means on the arm 76 and on the cross member insures stability against cocking of the power unit and also spreads and distributes the weight thereof in a desired manner. By reason of the toggle connection between the arms 70 and 76, the weight of the engine is uniformly distributed to both of the side rails 6 so that no cantilever effect is produced, and at the same time, vibration or stresses developed by the engine will be transmitted into compressive stresses in the arms, which they are well capable of withstanding.

It is therefore believed apparent that I have provided a novel type of engine support especially adapted for use in connection with a multi-powered vehicle, although it is obvious that this particular means of support might be employed in connection with other types of power units in vehicle constructions of a type differing from that shown in Figure 1.

I therefore do not intend to be limited to the exact details herein shown and described, but only insofar as defined by the scope and spirit of the appended claims.

I claim:

1. In a vehicle having a pair of longitudinally extending side rails, a transverse cross member between said rails, a power unit disposed adjacent one of said side rails rearwardly of said cross member and having one end supported therefrom, a jointed toggle arm extending between said side rails, and means resiliently mounting the other end of said power unit from said arm.

2. In combination with the side rails of a vehicle chassis, a transverse cross member extending therebetween, a power unit located adjacent one of said rails and on one side of said cross member, means resiliently supporting one end of said unit from said cross member, a trunnion at the other end of said unit, a pair of arms having opposite ends secured to said rails and having a hinged connection at their adjacent ends, and means resiliently supporting the trunnion end of said unit on one of said arms.

3. The combination of claim 2 wherein said hinged connection is disposed above the horizontal plane through the connection of said arms to said side rails whereby the weight of said supported end of said unit tends to compress the arms longitudinally.

4. In combination, a power unit having a trunnion at one end and a pair of laterally spaced brackets at the opposite end, a pair of side rails having a transverse cross member secured therebetween, a bracket carried by said cross member and secured to said pair of brackets for supporting said opposite end of said unit, an arm secured to and extending transversely from one side rail toward the other, means supported on said arm and secured about said trunnion, and a second arm hinged to the free end of said first arm and secured to said other side rail.

5. The combination, in a vehicle having a pair of side rails and a transverse cross member, of a power unit disposed on one side of said cross member adjacent one rail, means resiliently supporting one end of said unit from said cross member, and a toggle connection between said rails having means for supporting the other end of said unit.

6. The combination, in a vehicle having a pair of side rails and a transverse cross member, of a power unit, laterally spaced resilient means supporting one end of said unit from said cross member, a trunnion on the opposite end of said unit, a bracket having a journal portion receiving said trunnion, and a toggle connection between said rails suporting said bracket.

7. The combination of claim 6 further characterized in the provision of resilient means interposed between said toggle connection and said bracket.

8. Means for supporting a power unit on a vehicle chassis having a pair of side rails and a transverse cross member, comprising laterally spaced resilient connections between one end of said unit and said cross member, a trunnioned connection at the opposite end of said unit, and a pair of hinged arms secured between said side rails and resiliently supporting said trunnioned connection.

9. Means for supporting a power unit on a vehicle chassis having a pair of side rails and a transverse cross member, comprising laterally spaced resilient connections between one end of said unit and said cross member, an upwardly arched toggle connection between said side rails adjacent the other end of said unit, and means supported on one arm thereof having a trunnioned connection to said unit.

10. Means for supporting a power unit on a vehicle chassis having a pair of side rails with a transverse cross member, comprising an upwardly arched toggle arm connection between said side rails, means resiliently supporting one end of said unit from laterally spaced points on one of said toggle arms, and laterally spaced resilient means carried by said cross member supporting the opposite end of said unit.

11. Means for supporting a power unit on a vehicle chassis having a pair of side rails with a transverse cross member, comprising an upwardly arched toggle arm connection between said side rails, a trunnion on one end of said unit, a bracket journalled on said trunnion and having laterally spaced support on one of the arms of said toggle connection, and means carried by the cross member supporting the opposite end of said unit.

12. Means for supporting one end of a power unit between laterally spaced side rails, comprising a trunnion on the end of said unit, transversely extending arms secured to the side rails and hinged together intermediate said rails, a bracket journalled on said trunnion and having a portion thereof overlying one of said arms, and resilient means interposed between said bracket and arm.

13. The supporting means set forth in claim 12 further characterized in that said one arm is provided with spaced bosses and said bracket portion has correspondingly spaced portions preventing cocking of said bracket relative to said arm.

14. Means for supporting one end of a power unit from a channel-shaped flanged cross member of a vehicle chassis, comprising a bracket extending over the channel portion of said cross member and secured to the flanges thereof, said bracket having laterally projecting bosses spaced longitudinally relative to said cross member, a pair of laterally spaced brackets on said unit having portions overlying said bosses, and resilient means interposed between said bosses and the overlying portions of said brackets.

15. In a vehicle having longitudinally extending side rails, a power unit adapted to be disposed therebetween, and means for supporting one end of said unit from said rails comprising arm means secured to said rails and extending transversely therebetween, a depending bracket, resilient means supporting the upper end of said bracket from said arm means for limited lateral swinging movement and a trunnion end on said unit mounted in the lower free end of said bracket.

16. In a vehicle having longitudinally extending said rails, a cross member therebetween, a power unit adapted to be disposed between said rails, resiliently mounted means suspending one end of said unit from said cross member, arm means extending between said rails, a bracket resiliently supported thereon and depending freely therefrom, and means securing the other end of said unit in the lower free end of said bracket.

DONALD D. ORMSBY.